Jan. 14, 1930.    L. W. THOMPSON    1,743,737

REGULATING APPARATUS

Filed Dec. 5, 1925

Inventor:
Louis W. Thompson,
by Alexander F. Smith
His Attorney.

Patented Jan. 14, 1930

1,743,737

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

REGULATING APPARATUS

Application filed December 5, 1925. Serial No. 73,514.

My invention relates to apparatus for regulating the electrical conditions of a machine or circuit, and has for its principal object the provision of an improved regulating apparatus that is both sensitive and reliable in its operation.

It is desirable that apparatus for regulating the voltage or other condition of a circuit be responsive to very slight changes in the condition to be regulated. In accordance with my invention, this result is produced by an apparatus wherein thermionic and magnetic amplifiers are combined in a manner to magnify greatly the effect of slight changes in the condition regulated.

My invention will be better understood from the following description when considered in connection with the accompanying drawing and its scope will be pointed out in the appended claims.

Figure 1:
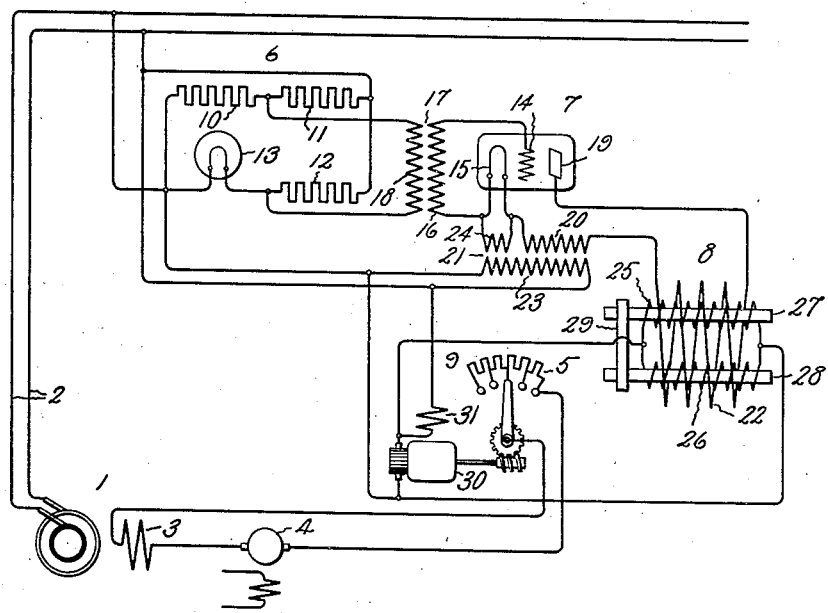
Figure 2:
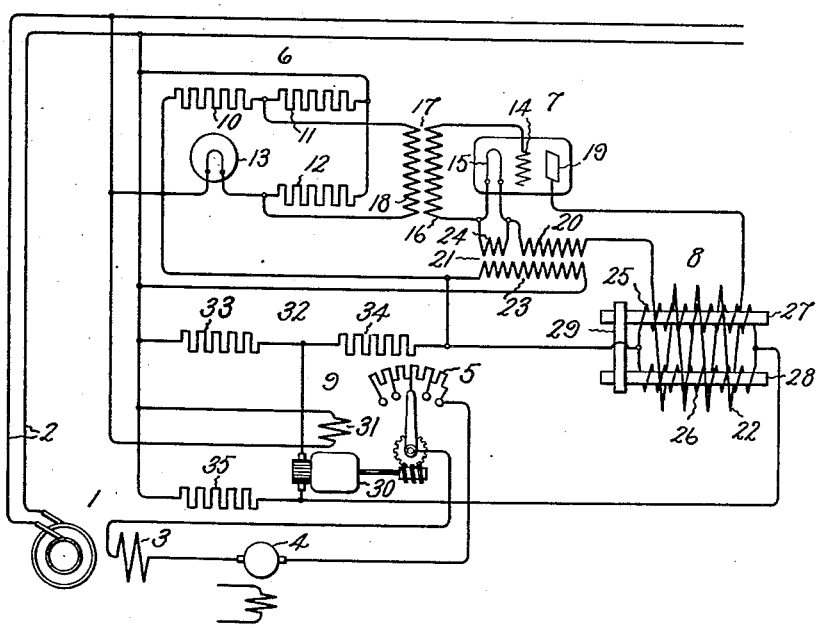

Referring to the drawings, Fig. 1 shows a regulating apparatus wherein my invention has been embodied; and Fig. 2 shows a modification of the apparatus shown by Fig. 1.

Fig. 1 shows a machine 1 comprising an armature circuit 2 and a field circuit 3 which is connected to current supply means 4 through a field resistor 5. Electro-responsive means shown as a balanced bridge device 6 is connected to a motor 9 through a thermionic amplifier 7 and a magnetic amplifier 8 for operating the resistor 5 in response to variation in the voltage of the circuit 2.

The bridge device 6 comprises impedance elements 10, 11 and 12 which preferably are made of a material having a zero temperature coefficient of resistance, and an element, shown as a ballast lamp 13, which has a positive temperature coefficient of resistance. The bridge 6 is connected to the circuit 2 at the junctures between elements 11 and 12 and between elements 10 and 13. With these connections, the elements of the bridge may be so related as to produce no potential difference between the juncture of elements 10 and 11 and that of 12 and 13 when the circuit 2 is operating at its normal voltage. When the circuit voltage varies from its normal value, however, a potential difference is produced between the juncture of elements 10 and 11 and that of elements 12 and 13. This potential is utilized to control the grid potential of the thermionic amplifier.

The amplifier 7 is connected in cascade with the magnetic amplifier 8 and comprises a grid 14 that is connected to a cathode 15 through the secondary circuit 16 of a transformer 17. The primary circuit 18 of the transformer 17 is connected to the juncture between the bridge elements 10 and 11 and that between the bridge elements 12 and 13. The amplifier also comprises an anode 19 that is connected to the cathode 15 through a secondary circuit 20 of a transformer 21 and the field winding 22 of the magnetic amplifier or saturated core regulator 8. The transformer 21 is provided with a primary winding adapted to be connected to the circuit 2 and with a secondary winding 24 for transmitting heating current to the cathode 15.

The magnetic amplifier 8 comprises impedance coils 25 and 26 which are oppositely wound on the core members 27 and 28 so that the current transmitted through them does not produce an electromotive force in the field coil 22. A short circuited winding 29 is provided for smoothing out pulsations in the rectified current supplied to the field winding 22 and allowing this current to produce magnetic saturation of the core members.

The motor 9 comprises an armature winding 30 and a field winding 31 which are connected to the circuit 2 in series with one another. With these connections the motor 9 operates in one direction as a series motor when the impedance of the device 8 is comparatively high and operates in the other direction as a repulsion motor when the impedance of the device 8 is low and the motor armature is substantially short circuited.

While the motor 9 has been shown as utilized to operate the field resistor 5, it will be understood that it may be utilized to regulate any device in response to variations in the electrical conditions of a circuit. The smallness of the variations required to operate a device in this manner will be apparent when it is realized that the thermionic device produces an amplification of about 8 to 1 and the magnetic device produces an amplification of something like 50 to 1. The apparatus is thus of rugged construction and is capable of producing a very fine degree of regulation.

The operation of the invention will be readily understood if it be assumed that the generator 1 is operating at normal voltage. Under these conditions, no voltage is applied to the transformer 17, the grid 14 is maintained at a potential which differs from that of the cathode 15 by the potential drop of winding 16, and just enough current is transmitted through the field winding of the magnetic amplifier to maintain the field and armature voltages of the motor 9 in such a phase relation that the motor torque is insufficient to operate the rheostat 5. When the voltage of the circuit 2 exceeds its normal value, however, the potential drop of the element 13 increases with respect to the potential drops of the other elements of the bridge, a positive potential is applied to the grid 14 during the half cycle when the cathode is charged to a negative potential, the saturation of the magnetic amplifier is increased, and the motor tends to run in a counter-clockwise direction as a repulsion motor, thereby increasing the generator field circuit resistance and decreasing the circuit voltage to its normal value. Likewise if the circuit voltage decreases below its normal value, the potential drop of the element 13 decreases with respect to the potential drops of the other elements of the bridge, a negative potential is applied through the transformer 17 to the grid 14 during the half cycle when the anode is positive, the saturation of the magnetic amplifier is decreased, and the motor tends to run in a clockwise direction as a series motor, thereby decreasing the generator field circuit resistance and increasing the circuit voltage to its normal value. Any slight departure of the circuit voltage from its normal value thus immediately produces a corrective effect. It should be noted that all of the current required to operate the apparatus is supplied from the circuit 2, thus avoiding the necessity of providing the batteries usually utilized in the various circuits of the thermionic amplifier.

Fig. 2 shows a modification of the invention wherein a bridge device 32 comprising elements 33 to 35 and the magnetic amplifier 8 is utilized to cause the motor 9 to be operated in one direction or the other depending on change in the potential drop of the amplifier 8. The operation of this modification will be apparent without further explanation.

The embodiments of the invention illustrated and described herein have been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of a circuit, a thermionic amplifier comprising a grid for controlling the transmission of current between its cathode and anode, means for varying the potential of said grid in accordance with an electrical condition of said circuit, a magnetic amplifier connected in cascade with said thermionic amplifier and arranged to have its degree of saturation varied in accordance with the variation in current through said thermionic device, and means operable in response to change in the saturation of said magnetic amplifier for controlling an electrical condition of said circuit.

2. The combination of a circuit, and concatenated thermionic and magnetic amplifiers connected to be supplied with current from said circuit for controlling an electrical condition of said circuit.

3. The combination of a circuit, a thermionic amplifier comprising a cathode and anode and connected to be responsive to an electrical condition of said circuit, and a magnetic amplifier provided with an impedance coil wound on a magnetic core and connected to said circuit and with a field coil connected to said circuit through said cathode and anode for controlling the saturation of said core to control an electrical condition of said circuit.

4. The combination of a circuit, a thermionic amplifier comprising a grid for controlling the transmission of current between its cathode and anode, a magnetic amplifier provided with an impedance coil wound on a magnetic core and connected to said circuit and with a field coil connected to said circuit through said cathode and anode for controlling the saturation of said core, and means adapted to be connected to said grid for regulating the current transmitted between said cathode and anode in accordance with an electrical condition of said circuit.

5. The combination of a circuit, a thermionic amplifier comprising a grid for controlling the transmission of current between its cathode and anode, a magnetic amplifier provided with an impedance coil wound on a magnetic core and with a field coil connected to said circuit through said cathode and anode for controlling the saturation of said core, means interposed between said grid and said circuit for controlling the potential of said grid in accordance with an electrical condition of said circuit, and means connected to said circuit in parallel with said impedance coil for regulating said condition.

6. The combination of a circuit, a thermionic amplifier comprising a grid for controlling the transmission of current between its cathode and anode, a magnetic amplifier provided with an impedance coil wound on a magnetic core and with a field coil connected to said circuit through said cathode and anode for controlling the saturation of said core, means interposed between said grid and circuit for controlling the potential of said grid in accordance with an electrical condition of said circuit, and a motor comprising an armature winding connected to said circuit in parallel with said impedance coil and a field winding connected to said circuit in series with said impedance coil for regulating said condition.

In witness whereof, I have hereunto set my hand this 4th day of December, 1925.

LOUIS W. THOMPSON.